United States Patent
Yuhara

(10) Patent No.: US 10,619,064 B2
(45) Date of Patent: Apr. 14, 2020

(54) WATER-BASED ACHROMATIC INK FOR INK-JET RECORDING AND INK-JET RECORDING APPARATUS

(71) Applicant: Brother Kogyo Kabushiki Kaisha, Nagoya-shi, Aichi-ken (JP)

(72) Inventor: Keisuke Yuhara, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/934,468

(22) Filed: Mar. 23, 2018

(65) Prior Publication Data
US 2018/0340087 A1 Nov. 29, 2018

(30) Foreign Application Priority Data
May 26, 2017 (JP) .................. 2017-104499

(51) Int. Cl.
*C09D 11/38* (2014.01)
*B41J 2/17* (2006.01)
(Continued)

(52) U.S. Cl.
CPC ............. *C09D 11/38* (2013.01); *B41J 2/1652* (2013.01); *B41J 2/16508* (2013.01); *B41J 2/16517* (2013.01); *B41J 2/16523* (2013.01); *B41J 2/1721* (2013.01); *B41J 2/17509* (2013.01); *C09D 11/107* (2013.01); *C09D 11/328* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; B41J 11/002; B41J 2/161; B41J 2/1623; B41J 2202/00; B41J 2202/03; B41J 2/14201; B41J 2/045; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; B41M 5/0011; B41M 5/0017; B41M 5/0047; B41M 7/00; B41M 7/0072; B41M 5/52; B41M 5/5218

See application file for complete search history.

(56) References Cited

U.S. PATENT DOCUMENTS

2004/0035320 A1* 2/2004 Sano ............... C09D 11/322
106/31.6
2007/0257975 A1* 11/2007 Yoneda ............ C09B 43/16
347/100

(Continued)

FOREIGN PATENT DOCUMENTS

JP 2003-268269 A 9/2003
JP 2010-280801 A 12/2010

*Primary Examiner* — Manish S Shah
(74) *Attorney, Agent, or Firm* — Banner & Witcoff, Ltd.

(57) ABSTRACT

A water-based achromatic ink for ink-jet recording includes: a dye; benzotriazole; a water-soluble polymer having an acid value of equal to or more than 70 mgKOH/g of which blending amount in the water-based achromatic ink is equal to or less than 2% by weight; and water.

16 Claims, 2 Drawing Sheets

(51) Int. Cl.
*C09D 11/328* (2014.01)
*B41J 2/165* (2006.01)
*C09D 11/107* (2014.01)
*B41J 2/175* (2006.01)

(56) References Cited

U.S. PATENT DOCUMENTS

2010/0079566 A1* 4/2010 Ishikawa .................. B41J 2/155
                                                                  347/92
2012/0274687 A1* 11/2012 Satake .................. B41J 2/16585
                                                                  347/9
2014/0345494 A1* 11/2014 Miyake .................. C09D 11/40
                                                                  106/31.48

* cited by examiner

WATER-BASED ACHROMATIC INK FOR INK-JET RECORDING AND INK-JET RECORDING APPARATUS

CROSS REFERENCE TO RELATED APPLICATION

The present application claims priority from Japanese Patent Application No. 2017-104499 filed on May 26, 2017, the disclosure of which is incorporated herein by reference in its entirety.

BACKGROUND OF THE INVENTION

Field of the Invention

The present invention relates to a water-based achromatic ink for ink-jet recording and an ink-jet recording apparatus.

Description of the Related Art

There is suggested a water-based ink for ink-jet recording (for example, see Japanese Patent Application Laid-open No. 2003-268269) that contains benzotriazole as a rust-preventive agent to prevent corrosion of a metal member making contact with the water-based ink for ink-jet recording. Examples of the metal member include a metal member included in an ink-jet head.

The water-based ink for ink-jet recording that contains the benzotriazole has the following problems. Namely, when the ink-jet recording apparatus includes, for example, a rubber member, such as a rubber tube, forming an ink channel, and when the rubber member contains zinc as a vulcanization auxiliary agent, the benzotriazole in the water-based ink reacts with the zinc in the rubber member to form a complex. This complex is deposited in the water-based ink due to its low solubility in water. The deposit generated in the water-based ink could cause jetting failure and/or discharge failure of the water-based ink in the ink-jet head.

Further, the water-based achromatic ink, such as a water-based black ink, has high visibility on a sheet or paper, and thus it needs good brightness. Especially, a printed object printed on glossy paper (e.g., an image, a letter, a text, etc., printed on glossy paper) by use of the water-based achromatic ink requires improvement in brightness.

In view of the above, an object of the present teaching is to provide a water-based achromatic ink that prevents corrosion of a metal member and generation of a deposit in the water-based ink and provides high brightness of a printed object printed on glossy paper.

SUMMARY OF THE INVENTION

According to a first aspect of the present teaching, there is provided a water-based achromatic ink for ink-jet recording, including: a dye; benzotriazole; a water-soluble polymer having an acid value of equal to or more than 70 mgKOH/g of which blending amount in the water-based achromatic ink is equal to or less than 2% by weight; and water.

According to a second aspect of the present teaching, there is provided an ink-jet recording apparatus, including: a water-based achromatic ink which contains: a dye; benzotriazole; a water-soluble polymer having an acid value of equal to or more than 70 mgKOH/g of which blending amount in the water-based achromatic ink is equal to or less than 2% by weight; and water; an ink-jet head configured to jet the water-based achromatic ink; a metal member making contact with the water-based achromatic ink; and a rubber member containing zinc and making contact with the water-based achromatic ink.

DESCRIPTION OF THE EMBODIMENTS

Figure 1:
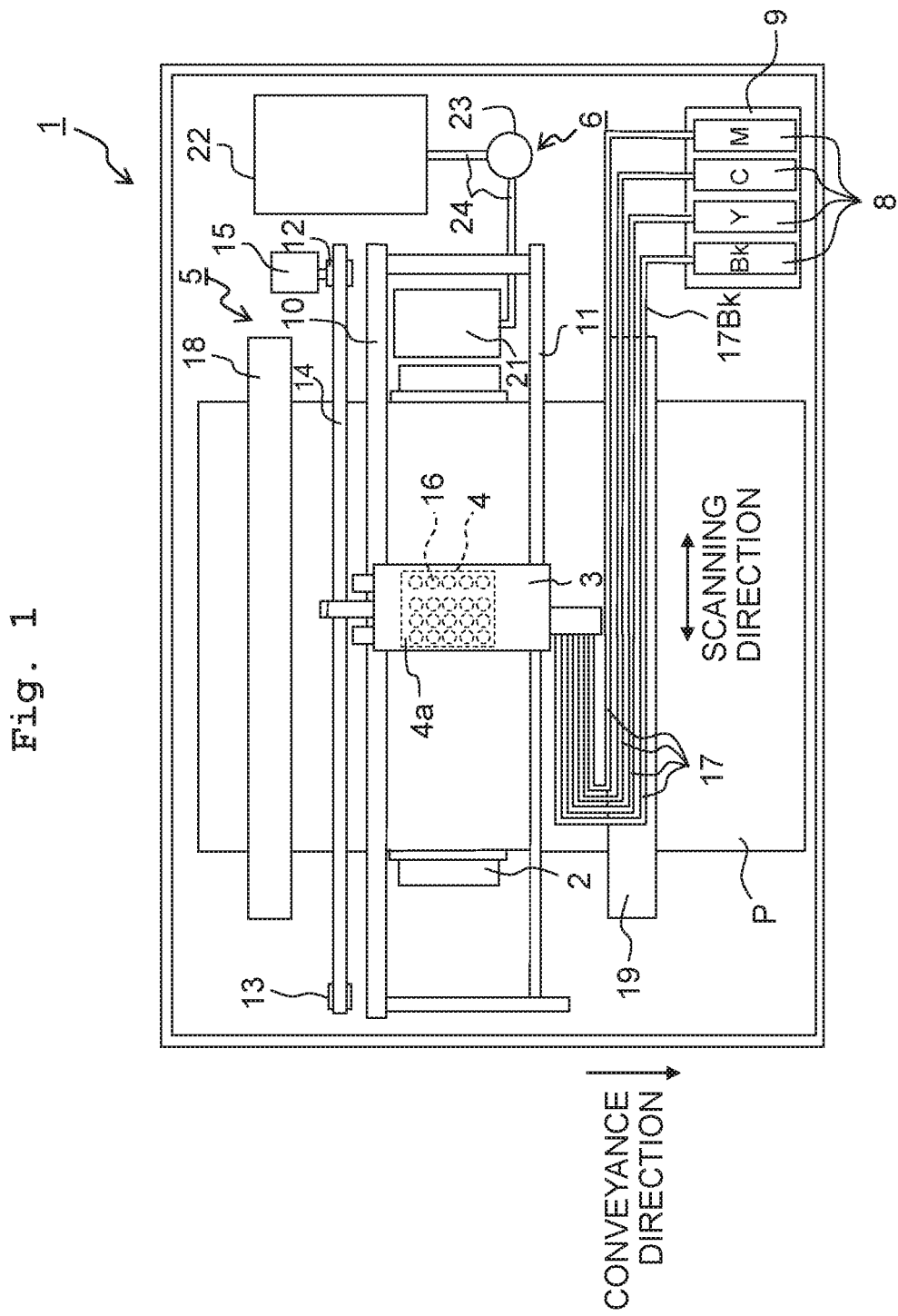
FIG. 1 is a schematic plan view of an exemplary structure of an ink-jet recording apparatus according to an embodiment of the present teaching.

A water-based achromatic ink for ink-jet recording according to this embodiment is explained (hereinafter referred to as "water-based achromatic ink", "water-based ink", or "ink" in some cases). In this embodiment, "achromatic colors" include, for example, achromatic colors except for white, such as black and gray. Among the water-based achromatic inks, the black ink has high visibility on a sheet or paper, thus especially requiring brightness of a printed object printed on glossy paper. Thus, the water-based achromatic ink of this embodiment is preferably the black ink. The water-based achromatic ink of this embodiment contains a dye, benzotriazole, a water-soluble polymer having an acid value of equal to or more than 70 mgKOH/g, and water.

The dye may be an achromatic dye or a chromatic dye. When the chromatic dye is used, more than two chromatic dyes that become achromatic by being mixed are used. The dye is not particularly limited, which is exemplified, for example, by direct dyes, acid dyes, basic dyes, and reactive dyes. Specified examples of the dye include, for example, C. I. Direct Black, C. I. Direct Blue, C. I. Direct Red, C. I. Direct Yellow, C. I. Direct Orange, C. I. Direct Violet, C. I. Direct Brown, C. I. Direct Green, C. I. Acid Black, C. I. Acid Blue, C. I. Acid Red, C. I. Acid Yellow, C. I. Acid Orange, C. I. Acid Violet, C. I. Basic Black, C. I. Basic Blue, C. I. Basic Red, C. I. Basic Violet, and C. I. Food Black. The C. I. Direct Black is exemplified, for example, by C. I. Direct Blacks 17, 19, 32, 51, 71, 108, 146, 154, and 168. The C. I. Direct Blue is exemplified, for example, by C. I. Direct Blues 6, 22, 25, 71, 86, 90, 106, and 199. The C. I. Direct Red is exemplified, for example, by C. I. Direct Reds 1, 4, 17, 28, 83, and 227. The C. I. Direct Yellow is exemplified, for example, by C. I. Direct Yellows 12, 24, 26, 86, 98, 132, 142, and 173. The C. I. Direct Orange is exemplified, for example, by C. I. Direct Oranges 34, 39, 44, 46, and 60. The C. I. Direct Violet is exemplified, for example, by C. I. Direct Violets 47 and 48. The C. I. Direct Brown is exemplified, for example, by C. I. Direct Brown 109. The C. I. Direct Green is exemplified, for example, by C. I. Direct Green 59. The C. I. Acid Black is exemplified, for example, by C. I. Acid Blacks 2, 7, 24, 26, 31, 52, 63, 112, and 118. The C. I. Acid Blue is exemplified, for example, by C. I. Acid Blues 9, 22, 40, 59, 90, 93, 102, 104, 117, 120, 167, 229, and 234. The C. I. Acid Red is exemplified, for example, by C. I. Acid Reds 1, 6, 32, 37, 51, 52, 80, 85, 87, 92, 94, 115, 180, 256, 289, 315, and 317. The C. I. Acid Yellow is exemplified, for example, by C. I. Acid Yellows 11, 17, 23, 25, 29, 42, 61, and 71. The C. I. Acid Orange is exemplified, for example, by C. I. Acid Oranges 7 and 19. The C. I. Acid Violet is exemplified, for example, by C. I. Acid Violet 49. The C. I. Basic Black is exemplified, for example, by C. I. Basic Black 2. The C. I. Basic Blue is exemplified, for example, by C. I. Basic Blues 1, 3, 5, 7, 9, 24, 25, 26, 28, and 29. The C. I. Basic Red is exemplified, for example, by C. I. Basic Reds 1, 2, 9, 12, 13, 14, and 37. The C. I. Basic Violet is exemplified, for example, by C. I. Basic Violets 7, 14, and 27. The C. I. Food Black is exemplified, for example, by C. I. Food Blacks 1 and 2.

Only one kind of the dye as described above may be used singly, or two or more kinds of the dyes may be used in combination, provided that the color of the water-based ink prepared is achromatic. In addition to the dye(s), the water-based achromatic ink of this embodiment may or may not contain any other colorant, such as pigment. The colorant is preferably formed only from the dye(s) to improve the brightness of the printed object.

The blending amount of the dye(s) in the entire amount of the water-based achromatic ink is not particularly limited, which is, for example, in a range of 0.1 to 20% by weight, preferably in a range of 1.0 to 15% by weight, and more preferably in a range of 5.0 to 10% by weight.

The benzotriazole is a rust-preventive agent that prevents corrosion of metal by being chemisorbed on a surface of the metal to form a protective layer. The water-based achromatic ink containing the benzotriazole reduces or prevents corrosion of a metal member making contact with the water-based achromatic ink. Especially, the water-based achromatic ink containing the benzotriazole effectively reduces or prevents corrosion of a metal member containing nickel. Examples of the metal member making contact with the water-based achromatic ink include a metal member(s) of an ink-jet head (e.g., a filter and an ink channel in the ink-jet head) and an ink channel communicating with the ink-jet head.

The blending amount of the benzotriazole in the entire amount of the water-based achromatic ink is, for example, in a range of 0.005 to 5% by weight, preferably in a range of 0.01 to 1% by weight, more preferably in a range of 0.05 to 0.5% by weight, and much more preferably in a range of 0.1 to 0.5% by weight.

The water-soluble polymer having an acid value of equal to or more than 70 mgKOH/g (hereinafter simply referred to as "water-soluble polymer" in some cases) prevents generation of a reactive product (deposit) formed from the benzotriazole in the water-based achromatic ink and zinc in a rubber member containing the zinc and making contact with the water-based achromatic ink. The rubber member containing the zinc is exemplified, for example, by a tube forming a channel for the water-based achromatic ink and a packing member in the ink-jet recording apparatus. The mechanism of allowing the water-soluble polymer to prevent the generation of the deposit is not clear, but it can be assumed that a carboxylic acid group (a carboxy group) of the water-soluble polymer reacts or interacts with the zinc, and this reaction or interaction occurs preferentially over the reaction between the zinc and the benzotriazole. The solubility of the reactive product formed from the zinc and the benzotriazole in water is low, whereas the solubility of the reactive product formed from the zinc and the water-soluble polymer in water is high. This prevents the generation of the deposit in the water-based achromatic ink. Thus, in this embodiment, it is possible to prevent jetting failure and discharge failure of the water-based achromatic ink in the ink-jet head which may otherwise be caused by the deposit. This mechanism, however, is just an assumption and the present teaching is not limited thereto.

The water-soluble polymer having an acid value of equal to or more than 70 mgKOH/g can sufficiently prevent the generation of the deposit in the water-based achromatic ink. The upper limit value of the acid value of the water-soluble polymer is not particularly limited, but a high acid value tends to increase viscosity of the water-soluble polymer. For the purpose of preventing the increase in viscosity of the water-based achromatic ink, the acid value of the water-soluble polymer is for example, equal to or less than 250 mgKOH/g, equal to or less than 240 mgKOH/g, or equal to or less than 200 mgKOH/g.

The weight-average molecular weight of the water-soluble polymer is not particularly limited. However, if the weight-average molecular weight is too large, the brightness of the printed object printed on the glossy paper could decrease and the viscosity of the water-soluble polymer could increase. If the weight-average molecular weight of the water-soluble polymer is too small, the reactivity with the zinc could decrease. In view of the above, the weight-average molecular weight of the water-soluble polymer is, for example, in a range of 6,000 to 16,500, in a range of 8,500 to 16,500, or in a range of 8,500 to 12,000.

The water-soluble polymer is not particularly limited provided that its acid value is equal to or more than 70 mgKOH/g. The water-soluble polymer is exemplified, for example, by acrylic resin, acrylic-styrene resin, urethane resin, polyvinyl alcohol resin, sodium polyacrylate, acrylic acid-maleic acid copolymer salt, and acrylic copolymer resin. Among the above, the water-soluble polymer is preferably the acrylic resin or the acrylic-styrene resin.

The water-soluble polymer may be prepared privately or independently, or a commercially available product may be used for the water-soluble polymer. Examples of the commercially available product include "JOHNCRYL (trade name) 6500JDX" (acid value: 70 mg KOH/g, weight-average molecular weight: 10,000, acrylic-styrene resin), "JOHNCRYL (trade name) 70" (acid value: 200 mg KOH/g, weight-average molecular weight: 16,500, acrylic-styrene resin), "JOHNCRYL (trade name) 61J" (acid value: 195 mg KOH/g, weight-average molecular weight: 12,000, acrylic-styrene resin), and "JOHNCRYL (trade name) 354" (acid value: 240 mg KOH/g, weight-average molecular weight: 8,500, acrylic-styrene resin) produced by BASF Corporation.

Only one kind of the water-soluble polymer as described above may be used singly, or two or more kinds of the water-soluble polymers may be used in combination.

The blending amount (solid content blending amount) of the water-soluble polymer in the entire amount of the water-based achromatic ink is equal to or less than 2% by weight. As described above, the water-soluble polymer prevents the generation of the deposit in the water-based achromatic ink. However, if the blending amount of the water-soluble polymer is excessive, the brightness of the printed object printed on the glossy paper would decrease. This mechanism is not clear, but it is assumed that the excessive blending amount of the water-soluble polymer makes the water-based polymer remain on the glossy paper to form concavities and convexities, which would scatter light to decrease the brightness. This mechanism, however, is just an assumption and the present teaching is not limited thereto. Making the blending amount of the water-soluble polymer equal to or less than 2% by weight prevents the generation of the deposit in the water-based achromatic ink and improves the brightness of the printed object printed on the glossy paper. Making the blending amount of the water-soluble polymer equal to or less than 1% by weight further improves the brightness of the printed object printed on the glossy paper. Making the blending amount of the water-soluble polymer equal to or less than 0.1% by weight much further improves the brightness of the printed object printed on the glossy paper. Although the lower limit value of the water-soluble polymer is not particularly limited, it is, for example, equal to or more than 0.002% by weight. Making the blending amount of the water-soluble polymer relatively small (e.g., in a range of 0.002 to 1% by weight) satisfactorily prevents the generation of the deposit in the water-based achromatic ink. Thus, the blending amount of the water-soluble polymer is preferably in a range of 0.002 to 2% by weight and more preferably in a range of 0.002 to 1% by weight.

In order to prevent the generation of the deposit in the water-based achromatic ink and enhance the brightness of the printed object printed on the glossy paper, the balance between the blending amount of the dye and the blending amount of the water-soluble polymer is important. The ratio (P/D) of the blending amount (P: % by weight) of the water-soluble polymer to the blending amount (D: % by weight) of the dye is preferably in a range of 0.00025 to 0.25, and more preferably in a range of 0.00025 to 0.13. The ratio (P/D) satisfying the above ranges can prevent the generation of the deposit in the water-based achromatic ink and improve the brightness of the printed object printed on the glossy paper.

In order to prevent the corrosion of the metal member making contact with the water-based achromatic ink and the generation of the deposit in the water-based achromatic ink, the balance between the blending amount of the benzotriazole and the blending amount of the water-soluble polymer is important. The ratio (P/B) of the blending amount (P: % by weight) of the water-soluble polymer to the blending amount (B: % by weight) of the benzotriazole is preferably in a range of 0.01 to 10, and more preferably in a range of 0.01 to 5. The ratio (P/B) satisfying the above ranges can prevent the corrosion of the metal member and the generation of the deposit in the water-based achromatic ink.

In order to achieve the prevention of corrosion of the metal member making contact with the water-based achromatic ink, the prevention of generation of the deposit in the water-based achromatic ink, and the improvement of brightness of the printed object printed on the glossy paper at the same time, the ratio of the blending amount of the water-soluble polymer to the total blending amount of the dye and the benzotriazole preferably satisfies a predefined ratio. The ratio (P/(D+B)) of the blending amount (P: % by weight) of the water-soluble polymer to the total blending amount (D+B: % by weight) of the dye and the benzotriazole is preferably in a range of 0.00024 to 0.24, more preferably in a range of 0.00024 to 0.12. The ratio (P/(D+B)) satisfying the above ranges can prevent the corrosion of the metal member and the generation of the deposit, and can improve the brightness of the printed object printed on the glossy paper.

The water in the water-based achromatic ink is preferably ion-exchanged water or pure water (purified water). The blending amount of the water (water ratio) in the entire amount of the water-based achromatic ink is appropriately determined depending on desired ink characteristics and the like. The water ratio may be, for example, a balance of the other components.

The water-based achromatic ink may further contain a water-soluble organic solvent. The water-soluble organic solvent is exemplified, for example, by a humectant that prevents the water-based achromatic ink from drying at an end of a nozzle in the ink-jet head and a penetrant that adjusts the drying velocity on a recording medium.

The humectant is not particularly limited, which is exemplified, for example, by lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyethers such as polyalkylene glycol; polyvalent alcohols such as alkylene glycol, glycerol, trimethylolpropane, and trimethylolethane; 2-pyrrolidone; N-methyl-2-pyrrolidone; and 1,3-dimethyl-2-imidazolidinone. The polyalkylene glycol is exemplified, for example, by polyethylene glycol and polypropylene glycol. The alkylene glycol is exemplified, for example, by ethylene glycol, propylene glycol, butylene glycol, diethylene glycol, triethylene glycol, dipropylene glycol, tripropylene glycol, thiodiglycol, and hexylene glycol. Only one kind of the humectant as described above may be used singly, or two or more kinds of the humectants may be used in combination. Among the above, the polyvalent alcohol such as alkylene glycol and glycerol is preferably used.

The blending amount of the humectant in the entire amount of the water-based achromatic ink is, for example, in a range of 0 to 95% by weight, preferably in a range of 5 to 80% by weight, and more preferably in a range of 5 to 50% by weight. The penetrant is exemplified, for example, by glycol ether. The glycol ether is exemplified, for example, by ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, and tripropylene glycol-n-butyl ether. Only one kind of the penetrant as described above may be used singly, or two or more kinds of the penetrants may be used in combination.

The blending amount of the penetrant in the entire amount of the water-based achromatic ink is, for example, in a range of 0 to 20% by weight, preferably in a range of 0 to 15% by weight, and more preferably in a range of 1 to 4% by weight.

The water-based achromatic ink may further contain a conventionally known additive, as necessary. The additive is exemplified, for example, by surfactants, pH-adjusting agents, viscosity-adjusting agents, surface tension-adjusting agents, and fungicides. The viscosity-adjusting agents are exemplified, for example, by polyvinyl alcohol, cellulose, and a water-based polymer.

The water-based achromatic ink may be prepared, for example, by mixing the dye, the benzotriazole, the water-soluble polymer having an acid value of equal to or more than 70 mgKOH/g, the water, and optionally other additive component(s) as necessary uniformly or homogeneously through any conventionally known method and then removing undissolved matters by a filter or the like.

As described above, the water-based achromatic ink for ink-jet recording according to this embodiment contains the dye, the benzotriazole, the water-soluble polymer having an acid value of equal to or more than 70 mgKOH/g, and the water. Making the blending amount of the water-soluble polymer in the water-based achromatic ink equal to or less than 2% by weight prevents the corrosion of the metal member and the generation of the deposit in the water-based ink, and improves the brightness of the printed object printed on the glossy paper.

Next, an ink cartridge (an exemplary ink container) according to this embodiment is explained. The ink cartridge of this embodiment is characterized by being an ink cartridge containing a water-based ink for ink-jet recording; wherein the water-based ink is the above water-based achromatic ink for ink-jet recording according to this embodiment. For example, any conventionally known main body (body) of an ink cartridge can be used as the main body of the ink cartridge according to this embodiment.

Next, an ink-jet recording method and an ink-jet recording apparatus of this embodiment is explained.

The ink-jet recording method of this embodiment is an ink-jet recording method of jetting a water-based ink for ink-jet recording from an ink-jet head to perform recording, characterized in that the water-based achromatic ink for ink-jet recording of the above embodiment is used as the water-based ink. The ink-jet recording method of this embodiment can be performed by using an ink-jet recording apparatus that includes a metal member making contact with the water-based achromatic ink and a rubber member containing zinc and making contact with the water-based achromatic ink. The recording includes printing a letter (text), printing an image, printing, etc. The ink-jet recording method of this embodiment can prevent the corrosion of the metal member, the generation of the deposit in the water-based achromatic ink, and can enhance the brightness of the printed object printed on the glossy paper.

The ink-jet recording apparatus of this embodiment is an ink-jet recording apparatus characterized by including: an ink accommodating section accommodating an ink therein; and an ink-jetting mechanism (ink-jet head) configured to jet the ink accommodated in the ink accommodating section; wherein the ink accommodated in the ink accommodating section is the water-based achromatic ink for ink-jet recording of this embodiment. The ink-jet recording apparatus of this embodiment includes a metal member making contact with the water-based achromatic ink and a rubber member containing zinc and making contact with the water-based achromatic ink.

FIG. 1 depicts an exemplary configuration of the ink-jet recording apparatus of this embodiment. As depicted in FIG. 1, an ink-jet recording apparatus 1 includes a platen 2, a carriage 3, an ink-jet head 4, a conveyance mechanism 5, and a maintenance assembly 6 as main constitutive components or parts. The ink-jet head 4 may be an ink-jet head of any system, such as a piezoelectric element system, a thermal ink-jet system, and an electrostatic attraction system.

Figure 2:
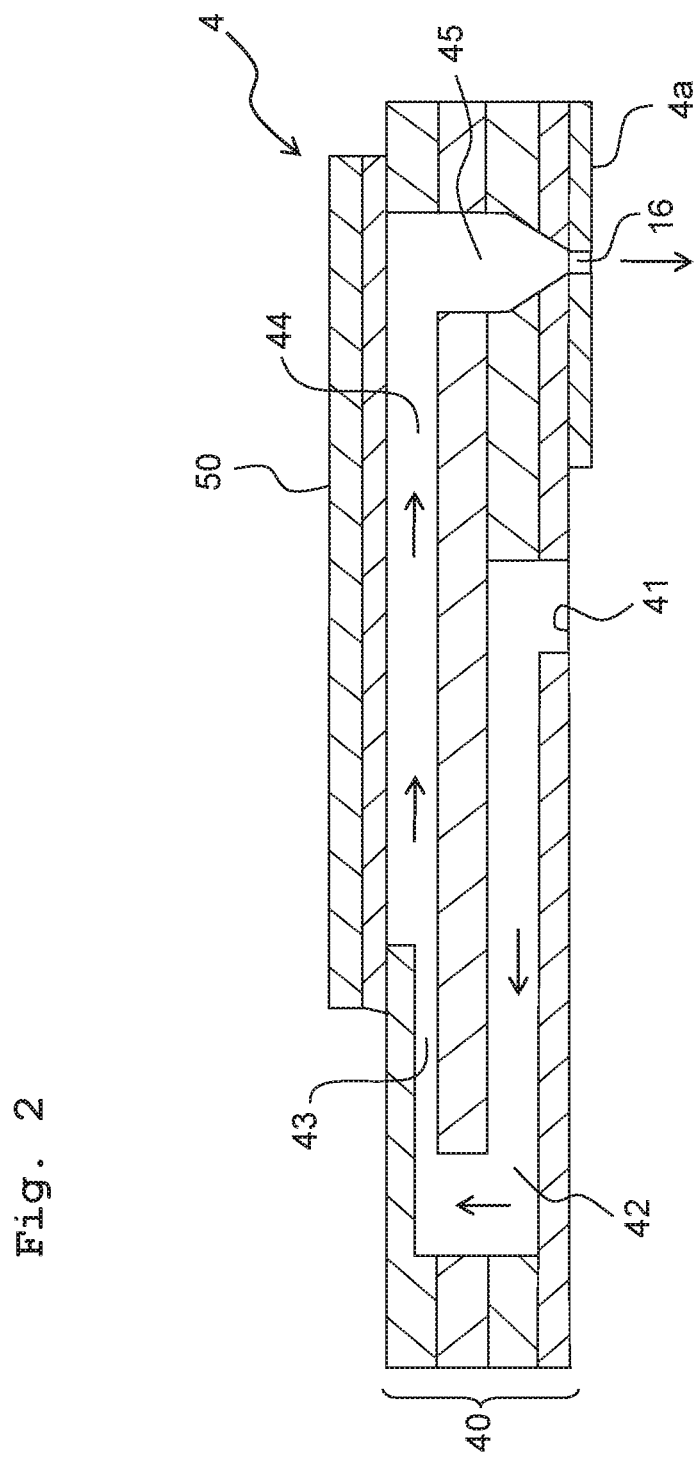
FIG. 2 is a schematic cross-sectional view of an ink-jet head of the ink-jet recording apparatus according to the embodiment of the present teaching.

FIG. 2 schematically depicts an exemplary ink-jet head of the piezoelectric element system. The ink-jet head 4 includes a cavity plate 40 and a piezoelectric actuator 50. The cavity plate 40 is formed from thin metal plates containing nickel. The cavity plate 40 has ink supply holes 41, connecting tubes (manifolds) 42, narrowed portions 43, pressure chambers 44, communication holes 45, and nozzles 16. These components communicate with each other to form ink channels. Although the ink supply hole 41 opens toward a jetting direction of the nozzle 16 in FIG. 2 for convenience, the ink supply hole 41 actually opens toward the piezoelectric actuator 50. The pressure chambers 44 are provided in the ink-jet head 4. The nozzles 16 communicating with the respective pressure chambers 44 are arranged substantially in line in a surface of the ink-jet head 4. The water-based achromatic ink is supplied to the pressure chamber 44 after passing through the ink supply hole 41, the connecting tube (manifold) 42, and the narrowed portion 43. Then, the piezoelectric actuator 50 applies pressure to the ink in the pressure chamber 44 to jet the ink from the nozzle 16 upon passing through the communication hole 45.

As depicted in FIG. 1, a recording medium P (e.g., recording paper) supplied from a feed mechanism (not depicted) is placed on an upper surface of the platen 2. Two guide rails 10 and 11 extending parallel to each other in a scanning direction (a left-right direction in FIG. 1) are provided above the platen 2. The carriage 3 is reciprocatively movable in the scanning direction along the two guide rails 10 and 11 in an area facing the platen 2.

The two guide rails 10 and 11 extend in the scanning direction beyond the left and right ends of the platen 2. The carriage 3 is configured to be movable from the area facing the recording paper P on the platen 2 (recording area) to positions located away from the left and right ends of the platen 2 (non-recording areas). An endless belt 14 wound between two pulleys 12 and 13 is connected to the carriage 3. The carriage 3 moves in the scanning direction according to the running of the endless belt 14 driven by a carriage drive motor 15.

The ink-jet head 4 is carried in a lower portion of the carriage 3. A lower surface of the ink-jet head 4 is a liquid jetting surface 4a which is parallel to the upper surface of the platen 2 and in which nozzles 16 are open. Recording is performed by jetting the ink(s) from the nozzles 16 of the liquid jetting surface 4a onto the recording paper P placed on the platen 2.

Four ink supply ports (not depicted) respectively corresponding to black, yellow, cyan and magenta inks are provided on an upper surface of the ink-jet head 4, and first ends of four tubes 17 are connected to the four ink supply ports, respectively. Second ends of the four tubes 17 are connected to a cartridge installation section 9 to which four ink cartridges (ink containers) 8 respectively storing the above four inks are installed detachably. With this configuration, the above four inks are supplied to the ink-jet head 4 from the four ink cartridges 8 installed in the cartridge installation section 9 via the four tubes 17, respectively. In the ink-jet recording apparatus 1, the black ink of the four inks is the above water-based achromatic ink of this embodiment. The black ink is supplied to the ink-jet head 4 via a tube 17Bk. Instead of using the four ink cartridges 2, it is allowable to use four ink bottles having a bottle shape, as ink containers.

The conveyance mechanism 5 has two conveyance rollers 18 and 19 which are disposed to sandwich the platen 2 therebetween in a conveyance direction (the direction from the top to the bottom of FIG. 1). The two conveyance rollers 18 and 19 convey the recording paper P placed on the platen 2 in the conveyance direction.

The ink-jet recording apparatus 1 jets the ink from the ink-jet head 4 carried on the carriage 3 to the recording paper P placed on the platen 2 and conveys the recording paper P in the conveyance direction by the two conveyance rollers 18 and 19, thereby recording a desired image, letter, or the like, on the recording paper P. Accordingly, a printed matter is obtained. Since the ink-jet recording apparatus 1 uses the black ink as the above water-based achromatic ink of this embodiment, the printed matter with high brightness can be obtained when the recording paper P is the glossy paper.

Next, the maintenance assembly 6 is explained. The maintenance assembly 6 includes a purge unit. The purge unit includes a waste liquid tank 22, a suction cap 21, and a suction pump 23 which are disposed on one side of the platen 2 in the scanning direction (on the right side in FIG. 1).

The suction cap 21 is driven by a cap drive mechanism (not depicted) including a drive mechanism, such as a motor, to move in an up-down direction. Namely, the suction cap 21 moves closer to or away from the ink jetting surface 4a. The suction pump 23 is connected to the suction cap 21 via a waste liquid tube 24. The suction cap 21 making contact with the ink jetting surface 4a covers the openings of the nozzles 16. Driving the pump 23 with the suction cap 21 being in a capping state and allowing the inside of the suction cap 21 to be subjected to suction and depressurization discharges inks from all of the nozzles 16 covered with the suction cap 21 (suction purge). The suction pump 23 is connected to the waste liquid tank 22 via the waste liquid tube 24. The inks sucked and discharged from the nozzles 16 through the suction purge are held in the waste liquid tank 22 via the waste liquid tube 24 and the suction pump 23. In this embodiment, the purge unit is configured to suck the inks from the nozzles 16 by using the suction pump 23. However, a so-called "push purge" may be adopted by use of a push purge unit in which pressure is applied to the inks in the ink-jet head 4 to discharge the inks from the nozzles 16.

In this embodiment, for example, the cavity plate 40, of the ink-jet head 4, including the ink channels is the metal member making contact with the water-based achromatic ink. The ink-jet recording apparatus 1 of this embodiment uses the black ink as the above water-based achromatic ink, thus preventing the corrosion of the metal member. Examples of the material of the metal member include nickel, iron, and chromium. The metal member containing the nickel can effectively reduce or prevent the corrosion of the nickel.

In this embodiment, for example, the tube 17Bk and/or the waste liquid tube 24 is/are the tube(s) forming the channel(s) of the water-based achromatic ink. The tube 17Bk and/or the waste liquid tube 24 is/are the rubber member(s) containing the zinc and making contact with the water-based achromatic ink. When the deposit is generated in the tube 17Bk by reacting the benzotriazole in the water-based achromatic ink with the zinc in the rubber member, the discharge failure of the water-based achromatic ink may occur in the ink-jet head 4. The deposit generated in the waste liquid tube 24 may cause the suction pump 23 not to perform the suction purge effectively, thus causing the discharge failure of the water-based achromatic ink in the ink-jet head 4. Since the ink-jet recording apparatus 1 of this embodiment uses the black ink as the water-based achromatic ink, it is possible to prevent the generation of the deposit in the tube 17Bk and/or the waste liquid tube 24 as well as the jetting failure and discharge failure of the water-based achromatic ink in the ink-jet head 4.

The rubber material used for the rubber member containing the zinc is not particularly limited, which may be, for example, elastomer or the like. The blending amount of the zinc in the rubber member may be, for example, in a range of 1,000 to 3,000 ppm.

EXAMPLES

Next, Examples of the present teaching are explained together with Comparative Examples. Note that the present teaching is not limited to and restricted by Examples and Comparative Examples described below.

Examples 1 to 12 and Comparative Examples 1 to 5

Respective components of water-based achromatic ink compositions (Tables 1 to 3) were mixed uniformly or homogeneously. After that, obtained mixtures were filtrated by using a hydrophilic polytetrafluoroethylene (PTFE) type membrane filter (pore size: 0.2 μm) produced by Advantec Toyo Kaisha, Ltd., and thus water-based achromatic inks for ink-jet recording according to Examples 1 to 12 and Comparative Examples 1 to 5 were obtained.

(1) Deposit evaluation, (2) corrosion evaluation, and (3) brightness evaluation of a printed object printed on glossy paper were carried out by means of the following methods with the water-based achromatic inks of Examples 1 to 12 and Comparative Examples 1 to 5. The evaluation results are indicated in Tables 1 to 3.

(1) Deposit Evaluation

In airtight containers, 2 cm×3 cm×2 mm test specimens (test pieces) were immersed in 20 g of the water-based achromatic inks of Examples 1 to 12 and Comparative Examples 1 to 5, and the airtight containers were stored for a week at 60° C. Elastomer rubber containing 2,000 ppm of zinc was used as the test pieces. After one week, the water-based achromatic inks were filtrated by using a hydrophilic polytetrafluoroethylene (PTFE) type membrane filter (pore size: 0.2 μm) produced by Advantec Toyo Kaisha, Ltd., and the presence or absence of the deposit remaining on the filter was confirmed by an optical microscope. The results of observation were evaluated based on the following evaluation criteria.

<Evaluation Criteria for Deposition Evaluation>

A: No deposit was confirmed;

C: A deposit was confirmed.

(2) Corrosion Evaluation

In airtight containers, 1 cm×0.5 cm×0.1 mm test specimens (test pieces) made of nickel were immersed in 20 g of the water-based achromatic inks of Examples 1 to 12 and Comparative Examples 1 to 5, and the airtight containers were stored for eight weeks at 60° C. After eight weeks, the nickel elution amount (Ni elution amount) from each of the test pieces to the corresponding one of the water-based achromatic inks was measured by using an ICP emission spectrophotometer CIROS-120EOP (model name) produced by Rigaku Corporation. The measurement results were evaluated based on the following evaluation criteria.

<Evaluation Criteria for Corrosion Evaluation>

A: The concentration of nickel in the water-based achromatic ink after the eight weeks was less than 5 ppm, and it was determined that the test piece did not corrode or slightly corroded;

C: The concentration of nickel in the water-based achromatic ink after the eight weeks was equal to or more than 5 ppm, and it was determined that the test piece corroded.

(3) Brightness Evaluation of a Printed Object Printed on Glossy Paper

The water-based achromatic inks of Examples 1 to 12 and Comparative Examples 1 to 5 were applied on sheets of glossy paper ("BP71G" produced by BROTHER KOGYO KABUSHIKI KAISHA) by using a bar coater (Rod No. 3 of a bar coater produced by Yasuda Seiki Seisakusho Ltd.) to make evaluation samples. The evaluation samples were visually observed, and the brightness of the printed objects printed on the sheets of glossy paper was evaluated based on the following evaluation criteria.

<Evaluation Criteria for Brightness Evaluation of a Printed Object Printed on Glossy Paper>
AA: Brightness was satisfactory;
A: Brightness was slightly inferior to AA;
B: Brightness was slightly inferior to AA and A, but no practical issue was caused;
C: Brightness was unsatisfactory, and a practical issue was caused.

TABLE 1

| | | | | | Example | | | | | | |
|---|---|---|---|---|---|---|---|---|---|---|---|
| | | | | | 1 | 2 | 3 | 4 | 5 | 6 | 7 |
| Water-based achromatic ink composition (% by weight) | (D) | C.I. Food Black 2 (*1) | | | 8 | 8 | 8 | 8 | 8 | 8 | 8 |
| | (B) | benzotriazole | | | 0.2 | 0.2 | 0.2 | 0.2 | 0.2 | 0.2 | 0.2 |
| | (P) | JOHNCRYL (trade name) 70 (*2) | acid value: 200 | molecular weight: 16,500 | — | — | — | — | — | 0.002 | 0.42 |
| | | JOHNCRYL (trade name) 61J (*3) | acid value: 195 | molecular weight: 12,000 | — | — | — | — | — | — | — |
| | | JOHNCRYL (trade name) 6500JDX (*4) | acid value: 70 | molecular weight: 10,000 | 0.002 | 0.1 | 0.42 | 1 | 2 | — | — |
| | | JOHNCRYL (trade name) 354 (*5) | acid value: 240 | molecular weight: 8,500 | — | — | — | — | — | — | — |
| | | PEG6000 (*6) | acid value: 0 | molecular weight: 6,000 | — | — | — | — | — | — | — |
| | | glycerol | | | 20 | 20 | 20 | 20 | 20 | 20 | 20 |
| | | triethylene glycol | | | 5 | 5 | 5 | 5 | 5 | 5 | 5 |
| | | triethylene glycol n-butyl ether | | | 5 | 5 | 5 | 5 | 5 | 5 | 5 |
| | | Olfine (trade name) E1010 (*7) | | | 0.5 | 0.5 | 0.5 | 0.5 | 0.5 | 0.5 | 0.5 |
| | | Sunnol (trade name) NL-1430 (*8) | | | 0.4 | 0.4 | 0.4 | 0.4 | 0.4 | 0.4 | 0.4 |
| | | Water | | | balance | balance | balance | balance | balance | balance | balance |
| | | (P/D) | | | 0.00025 | 0.013 | 0.053 | 0.13 | 0.25 | 0.00025 | 0.053 |
| | | (P/B) | | | 0.01 | 0.5 | 2.1 | 5 | 10 | 0.01 | 2.1 |
| | | (P/(D + B)) | | | 0.00024 | 0.012 | 0.051 | 0.12 | 0.24 | 0.00024 | 0.051 |
| Evaluation | | (1) deposit evaluation | | | A | A | A | A | A | A | A |
| | | (2) corrosion evaluation | | | A | A | A | A | A | A | A |
| | | (3) brightness evaluation | | | AA | AA | A | A | B | A | A |

TABLE 2

| | | | | | Example | | | | |
|---|---|---|---|---|---|---|---|---|---|
| | | | | | 8 | 9 | 10 | 11 | 12 |
| Water-based achromatic ink composition (% by weight) | (D) | C.I. Food Black 2 (*1) | | | 8 | 8 | 8 | 8 | 8 |
| | (B) | benzotriazole | | | 0.2 | 0.2 | 0.2 | 0.2 | 0.2 |
| | (P) | JOHNCRYL (trade name) 70 (*2) | acid value: 200 | molecular weight: 16,500 | — | — | — | — | — |
| | | JOHNCRYL (trade name) 61J (*3) | acid value: 195 | molecular weight: 12,000 | 0.002 | 0.1 | 0.42 | — | — |
| | | JOHNCRYL (trade name) 6500JDX (*4) | acid value: 70 | molecular weight: 10,000 | — | — | — | — | — |
| | | JOHNCRYL (trade name) 354 (*5) | acid value: 240 | molecular weight: 8,500 | — | — | — | 0.002 | 0.42 |
| | | PEG6000 (*6) | acid value: 0 | molecular weight: 6,000 | — | — | — | — | — |
| | | glycerol | | | 20 | 20 | 20 | 20 | 20 |
| | | triethylene glycol | | | 5 | 5 | 5 | 5 | 5 |
| | | triethylene glycol n-butyl ether | | | 5 | 5 | 5 | 5 | 5 |
| | | Olfine (trade name) E1010 (*7) | | | 0.5 | 0.5 | 0.5 | 0.5 | 0.5 |
| | | Sunnol (trade name) NL1430 (*8) | | | 0.4 | 0.4 | 0.4 | 0.4 | 0.4 |
| | | Water | | | balance | balance | balance | balance | balance |
| | | (P/D) | | | 0.00025 | 0.013 | 0.053 | 0.00025 | 0.053 |
| | | (P/B) | | | 0.01 | 0.5 | 2.1 | 0.01 | 2.1 |
| | | (P/(D + B)) | | | 0.00024 | 0.012 | 0.051 | 0.00024 | 0.051 |
| Evaluation | | (1) deposit evaluation | | | A | A | A | A | A |
| | | (2) corrosion evaluation | | | A | A | A | A | A |
| | | (3) brightness evaluation | | | AA | AA | A | AA | A |

TABLE 3

|  |  |  |  | Comparative Example | | | | |
|---|---|---|---|---|---|---|---|---|
|  |  |  |  | 1 | 2 | 3 | 4 | 5 |
| Water-based achromatic ink composition (% by weight) | (D) | C.I. Food Black 2 (*1) | | 8 | 8 | 8 | 8 | 8 |
| | (B) | benzotriazole | | 0.2 | — | 0.2 | 0.2 | 0.2 |
| | (P) | JOHNCRYL (trade name) 70 (*2) | acid value: 200 molecular weight: 16,500 | — | — | — | — | — |
| | | JOHNCRYL (trade name) 61J (*3) | acid value: 195 molecular weight: 12,000 | — | — | — | — | — |
| | | JOHNCRYL (trade name) 6500JDX (*4) | acid value: 70 molecular weight: 10,000 | — | 0.002 | 3 | — | — |
| | | JOHNCRYL (trade name) 354 (*5) | acid value: 240 molecular weight: 8,500 | — | — | — | — | — |
| | | PEG6000 (*6) | acid value: 0 molecular weight: 6,000 | — | — | — | 0.002 | 0.42 |
| | | glycerol | | 20 | 20 | 20 | 20 | 20 |
| | | triethylene glycol | | 5 | 5 | 5 | 5 | 5 |
| | | triethylene glycol n-butyl ether | | 5 | 5 | 5 | 5 | 5 |
| | | Olfine (trade name) E1010 (*7) | | 0.5 | 0.5 | 0.5 | 0.5 | 0.5 |
| | | Sunnol (trade name) NL1430 (*8) | | 0.4 | 0.4 | 0.4 | 0.4 | 0.4 |
| | | Water | | balance | balance | balance | balance | balance |
| | | (P/D) | | 0 | 0.00025 | 0.38 | 0.00025 | 0.053 |
| | | (P/B) | | 0 | — | 15 | 0.01 | 2.1 |
| | | (P/(D + B)) | | 0 | 0.00025 | 0.37 | 0.00024 | 0.051 |
| Evaluation | | (1) deposit evaluation | | C | A | A | C | C |
| | | (2) corrosion evaluation | | A | C | A | A | A |
| | | (3) brightness evaluation | | A | A | C | AA | A |

The ingredients or constituents *1 to *8 included in the water-based achromatic inks indicated in Tables 1 to 3 are as follows. The blending amounts of the dyes, the blending amounts of the water-soluble polymers, and the blending amounts of the surfactants indicated in Tables 1 to 3 each indicate a solid content blending amount (an active ingredient amount).

*1: a black dye
*2: a water-soluble polymer, acid value: 200 mg KOH/g, weight-average molecular weight: 16,500, acrylic-styrene resin, produced by BASF Corporation
*3: a water-soluble polymer, acid value: 195 mg KOH/g, weight-average molecular weight: 12,000, acrylic-styrene resin, produced by BASF Corporation
*4: a water-soluble polymer, acid value: 70 mg KOH/g, weight-average molecular weight: 10,000, acrylic-styrene resin, produced by BASF Corporation
*5: a water-soluble polymer, acid value: 240 mg KOH/g, weight-average molecular weight: 8,500, acrylic-styrene resin, produced by BASF Corporation
*6: a water-soluble polymer, acid value: 0 mg KOH/g, weight-average molecular weight: 6,000, polyethylene glycol
*7: a nonionic surfactant, produced by Nissin Chemical Industry Co., Ltd.
*8: an anionic surfactant, produced by Lion Specialty Chemicals Co., Ltd.

As indicated in Tables 1 to 3, the evaluation results of Examples 1 to 12 were satisfactory in relation to (1) deposit evaluation, (2) corrosion evaluation, and (3) brightness evaluation of a printed object printed on glossy paper. Namely, in each of Examples 1 to 12, the generation of the deposit in the water-based ink and the corrosion of the metal member were prevented and the brightness of the printed object printed on the glossy paper was satisfactory.

In Examples 1 to 5 using the same water-soluble polymer and having different blending amounts of the water-soluble polymer, each of Examples 1 to 4, in which the blending amount of the water-soluble polymer was in a range of 0.002 to 1% by weight, had better brightness of the printed object printed on the glossy paper. Especially, each of Examples 1 and 2, in which the blending amount of the water-soluble polymer was in a range of 0.002 to 0.1% by weight, had much better brightness. In Examples 1, 6, 8, and 11 using different kinds of water-soluble polymers and having the same blending amount thereof, each of Examples 1, 8, and 11 using the water-soluble polymer of which weight-average molecular weight was in a range of 8, 500 to 12,000 had better brightness of the printed object printed on the glossy paper.

In all of the water-based inks of Examples 1 to 12, the ratio (P/D) of the blending amount (P: % by weight) of the water-soluble polymer to the blending amount (D: % by weight) of the dye was in a range of 0.00025 to 0.25, the ratio (P/B) of the blending amount (P: % by weight) of the water-soluble polymer to the blending amount (B: % by weight) of the benzotriazole was in a range of 0.01 to 10, and the ratio (P/(D+B)) of the blending amount (P: % by weight) of the water-soluble polymer to the total blending amount (D+B: % by weight) of the dye and the benzotriazole was in a range of 0.00024 to 0.24.

In Comparative Example 1 using the water-based achromatic ink that did not contain the water-soluble polymer having an acid value of equal to or more than 70 mg KOH/g, the deposit was observed in the deposition evaluation. In Comparative Example 2 using the water-based achromatic ink that did not contain the benzotriazole, the corrosion of the test piece was observed in the corrosion evaluation. In Comparative Example 3 using the water-based achromatic ink in which the blending amount of the water-soluble polymer having an acid value of equal to or more than 70 mg KOH/g exceeded 2% by weight, the brightness of the printed object printed on the glossy paper was bad. In each of Comparative Examples 4 and 5 in which the water-soluble polymer having an acid value of 0 mg KOH/g was used instead of the water-soluble polymer having an acid value of equal to or more than 70 mg KOH/g, the deposit was observed in the deposit evaluation irrespective of the blending amount of the water-soluble polymer.

As described above, the water-based achromatic ink of the present teaching prevents the corrosion of the metal member and the generation of the deposit, and improves the brightness of the printed object printed on the glossy paper. The way of use of the water-based achromatic ink of the present teaching is not specifically limited. The water-based achromatic ink of the present teaching is widely applicable to various types of the ink-jet recording.

What is claimed is:

1. A water-based achromatic ink for ink-jet recording, comprising:
    a dye;
    benzotriazole;
    a water-soluble polymer having an acid value of equal to or more than 70 mgKOH/g of which blending amount in the water-based achromatic ink is equal to or less than 2% by weight; and
    water,
    wherein the water-based achromatic ink contains no pigment, and
    wherein a ratio (P/D) of the blending amount (P) of the water-soluble polymer to a blending amount (D) of the dye in the water-based achromatic ink is in a range of 0.00025 to 0.13.

2. The water-based achromatic ink for ink-jet recording according to claim 1, wherein a weight-average molecular weight of the water-soluble polymer is in a range of 8,500 to 16,500.

3. The water-based achromatic ink for ink-jet recording according to claim 1, wherein a weight-average molecular weight of the water-soluble polymer is in a range of 8,500 to 12,000.

4. The water-based achromatic ink for ink-jet recording according to claim 1, wherein the blending amount of the water-soluble polymer in the water-based achromatic ink is in a range of 0.002 to 2% by weight.

5. The water-based achromatic ink for ink-jet recording according to claim 1, wherein the blending amount of the water-soluble polymer in the water-based achromatic ink is in a range of 0.002 to 1% by weight.

6. The water-based achromatic ink for ink-jet recording according to claim 1, wherein the blending amount of the water-soluble polymer in the water-based achromatic ink is in a range of 0.002 to 0.1% by weight.

7. The water-based achromatic ink for ink-jet recording according to claim 1, wherein the water-soluble polymer has an acid value of 70 to 250 mgKOH/g.

8. The water-based achromatic ink for ink-jet recording according to claim 1, wherein a ratio (PB) of the blending amount (P) of the water-soluble polymer to a blending amount (B) of the benzotriazole in the water-based achromatic ink is in a range of 0.01 to 10.

9. The water-based achromatic ink for ink-jet recording according to claim 1, wherein a ratio (P/(D+B)) of the blending amount (P) of the water-soluble polymer to a total blending amount (D+B) of the dye and the benzotriazole in the water-based achromatic ink is in a range of 0.00024 to 0.24.

10. The water-based achromatic ink for ink-jet recording according to claim 1, wherein the water-soluble polymer is acrylic resin or acrylic-styrene resin.

11. An ink-jet recording apparatus, comprising:
    a water-based achromatic ink which contains: a dye; benzotriazole; a water-soluble polymer having an acid value of equal to or more than 70 mgKOH/g of which blending amount in the water-based achromatic ink is equal to or less than 2% by weight; and water;
    an ink-jet head configured to jet the water-based achromatic ink;
    a metal member making contact with the water-based achromatic ink; and
    a rubber member containing zinc and making contact with the water-based achromatic ink,
    wherein the water-based achromatic ink contains no pigment.

12. The ink-jet recording apparatus according to claim 11, wherein the rubber member containing the zinc is a tube forming a channel of the water-based achromatic ink.

13. The ink-jet recording apparatus according to claim 12, wherein the ink-jet recording apparatus further includes a maintenance assembly configured to discharge the water-based achromatic ink from the ink-jet head; and
    the tube is a waste liquid tube forming the channel of the water-based achromatic ink discharged from the ink-jet head.

14. The ink-jet recording apparatus according to claim 11, wherein the rubber member containing the zinc contains the zinc of 1,000 to 3,000 ppm.

15. The ink-jet recording apparatus according to claim 11, wherein the metal member is included in the ink-jet head.

16. The ink-jet recording apparatus according to claim 11, wherein the metal member contains nickel.

* * * * *